(12) United States Patent
Fujii et al.

(10) Patent No.: US 10,119,528 B2
(45) Date of Patent: Nov. 6, 2018

(54) ELECTRIC COMPRESSOR WITH COMPONENT FOR BLOCKING ELECTROMAGNETIC NOISE

(71) Applicant: KABUSHIKI KAISHA TOYOTA JIDOSHOKKI, Kariya-shi, Aichi-ken (JP)

(72) Inventors: Akio Fujii, Aichi-ken (JP); Yusuke Kinoshita, Aichi-ken (JP); Kazuhiro Kuroki, Aichi-ken (JP); Tatsuya Koide, Aichi-ken (JP)

(73) Assignee: KABUSHIKI KAISHA TOYOTA JIDOSHOKKI, Kariya-shi, Aichi-ken (JP)

( * ) Notice: Subject to any disclaimer, the term of this patent is extended or adjusted under 35 U.S.C. 154(b) by 725 days.

(21) Appl. No.: 14/699,238

(22) Filed: Apr. 29, 2015

(65) Prior Publication Data

US 2015/0322948 A1 Nov. 12, 2015

(30) Foreign Application Priority Data

May 7, 2014 (JP) ................. 2014-095978

(51) Int. Cl.
*H02K 5/00* (2006.01)
*H02K 5/22* (2006.01)
(Continued)

(52) U.S. Cl.
CPC .......... *F04B 35/04* (2013.01); *F04C 18/0215* (2013.01); *F04C 23/02* (2013.01);
(Continued)

(58) Field of Classification Search
CPC ............ H02K 5/00; H02K 5/22; H02K 5/225; H02K 11/01; H02K 11/02; H02K 11/022;
(Continued)

(56) References Cited

U.S. PATENT DOCUMENTS

2003/0200761 A1* 10/2003 Funahashi ............... F01C 21/10
62/228.4
2009/0294172 A1* 12/2009 Nakanishi .......... H05K 7/20445
174/548

(Continued)

FOREIGN PATENT DOCUMENTS

JP 2010-112261 A 5/2010

*Primary Examiner* — John K Kim
*Assistant Examiner* — Minki Chang
(74) *Attorney, Agent, or Firm* — Sughrue Mion, PLLC

(57) ABSTRACT

An electric compressor includes a housing a compression mechanism, an electric motor and a motor driving circuit. The motor driving circuit includes a circuit board and an electronic component mounted on the circuit board. The electric compressor further includes a bus bar, a shield plate having a bolt hole and an intervening portion interposed between the bus bar and the shield plate. The bus bar, intervening portion and the shield plate are integrated by a resin member. A part of the intervening portion on a side thereof opposite from the shield plate and/or a part of the bus bar on a side thereof opposite from the shield plate is exposed without being covered with the resin member. A surface of the shield plate around the bolt hole on a side thereof opposite from the intervening portion is exposed without being covered with the resin member.

5 Claims, 5 Drawing Sheets

(51) Int. Cl.
*F04B 35/04* (2006.01)
*F04C 23/02* (2006.01)
*H02K 11/02* (2016.01)
*F04C 18/02* (2006.01)
*F04C 29/00* (2006.01)
*H02K 11/22* (2016.01)

(52) U.S. Cl.
CPC ........... *F04C 29/0085* (2013.01); *H02K 5/22* (2013.01); *H02K 5/225* (2013.01); *H02K 11/022* (2013.01)

(58) Field of Classification Search
CPC ....... H02K 11/024; F04B 35/04; F04B 39/00; F04C 18/0215; F04C 23/02; F04C 29/00; F04C 29/0085
USPC ...... 310/66, 68 R, 71, 86, 89, 91; 417/410.1
See application file for complete search history.

(56) References Cited

U.S. PATENT DOCUMENTS

| | | | |
|---|---|---|---|
| 2010/0181876 A1* | 7/2010 | Watanabe | F04B 35/04 310/68 D |
| 2011/0211980 A1 | 9/2011 | Shibuya et al. | |
| 2014/0239750 A1* | 8/2014 | Nagao | H02K 5/20 310/43 |
| 2014/0239755 A1* | 8/2014 | Nagao | H02K 5/20 310/54 |
| 2014/0239758 A1* | 8/2014 | Nagao | H02K 5/225 310/71 |
| 2015/0357886 A1* | 12/2015 | Ishizeki | F04D 25/06 310/71 |
| 2016/0254723 A1* | 9/2016 | Suzuki | H02K 5/225 310/43 |

* cited by examiner

ELECTRIC COMPRESSOR WITH COMPONENT FOR BLOCKING ELECTROMAGNETIC NOISE

BACKGROUND OF THE INVENTION

The present invention relates to an electric compressor having a compression mechanism, an electric motor and a motor driving circuit.

Japanese Patent Application Publication No. 2010-112261 discloses an electric compressor having a housing that accommodates therein a compression mechanism for compressing a refrigerant gas, an electric motor for driving the compression mechanism and a motor driving circuit for driving the electric motor. The motor driving circuit includes a circuit board and electronic components that are mounted on the circuit board.

The electric compressor further has a bus bar for supplying electric power from an external power supply to the circuit board. The bus bar is resin-molded integrally with a washer through which a bolt is inserted. The washer serves as a seat for the bolt. With the bolt inserted through the washer and screwed into a boss of the housing, the bus bar is fixed to the housing through resin. The resin ensures insulation between the bus bar and the housing.

An electromagnetic noise is generated from the electronic components, and there is a fear that motor driving circuit may malfunction when the electromagnetic noise transmitted to the bus bar. In order to prevent the transmission of the electromagnetic noise, a shield plate that can intercept the electromagnetic noise may be interposed between the electronic components and the bus bar. The shield plate and the bus bar are disposed in such a state that the insulation is secured. Accordingly, the malfunction of the motor driving circuit caused by the transmission of the electromagnetic noise to the bus bar is prevented because the electromagnetic noise generated from the electronic components is intercepted by the shield plate.

From the viewpoint of downsizing the electric compressor, the above shield plate is preferably molded integrally with the bus bar. In molding of the bus bar and the shield plate, each bus bar and the shield plate need to be held in place by a pair of mold members so as not to be displaced in the mold by the injection pressure of resin.

The shield plate may be held by the mold members with the surface of the shield plate on side thereof that is opposite from the bus bar placed in contact with a part of one of the mold members and the surface of the shield plate on the side on which the bus bar is provided placed in contact with a part of the other mold member where no bus bar is formed. In some case, however, the bus bar may not be held properly by the pair of mold members because part of one of the mold member is unable to be placed in contact with the surface of bus bar on the side thereof facing the shield plate due to the interference with the shield plate.

In such case, a hole may be formed through the shield plate, through which a part of the one of the mold members is inserted so as to be into contact with a part of the bus bar on the side thereof facing the shield plate. The other side of the bus bar is set into contact with a part of the other mold member, with the result that the bus bar is held by a pair of the mold members.

In the configuration in which the bus bar and the shield plate are integrally resin-molded, however, the bus bar is exposed through the hole and, consequently, the electromagnetic noise is transmitted from the electronic components through the hole to the bus bar. In addition, the aforementioned washer that is used to fix the bus bar to the housing increases the number of parts of the electric compressor.

The present invention, which has been made in light of the problems mentioned above, is directed to providing an electric compressor that prevents the transmission of an electromagnetic noise from electronic components to the bus bar while permitting to reduce the number of parts.

SUMMARY OF THE INVENTION

In accordance with an aspect of the present invention, there is provided an electric compressor including a housing. The electric compressor further includes a compression mechanism, an electric motor and a motor driving circuit disposed in the housing. The motor driving circuit includes a circuit board and an electronic component mounted on the circuit board. The electric compressor further includes a bus bar, a shield plate having a bolt hole and an intervening portion that is made of a resin and interposed between the bus bar and the shield plate for preventing transmission of electromagnetic noise. The bus bar, intervening portion and the shield plate are integrated by a resin member. A part of the intervening portion on a side thereof opposite from the shield plate and/or a part of the bus bar on a side thereof opposite from the shield plate is exposed without being covered with the resin member. A surface of the shield plate around the bolt hole on a side thereof opposite from the intervening portion is exposed without being covered with the resin member.

Other aspects and advantages of the invention will become apparent from the following description, taken in conjunction with the accompanying drawings, illustrating by way of example the principles of the invention.

BRIEF DESCRIPTION OF THE DRAWINGS

The invention together with objects and advantages thereof, may best be understood by reference to the following description of the presently preferred embodiments together with the accompanying drawings in which.

DETAILED DESCRIPTION OF THE EMBODIMENTS

Figure 1A:
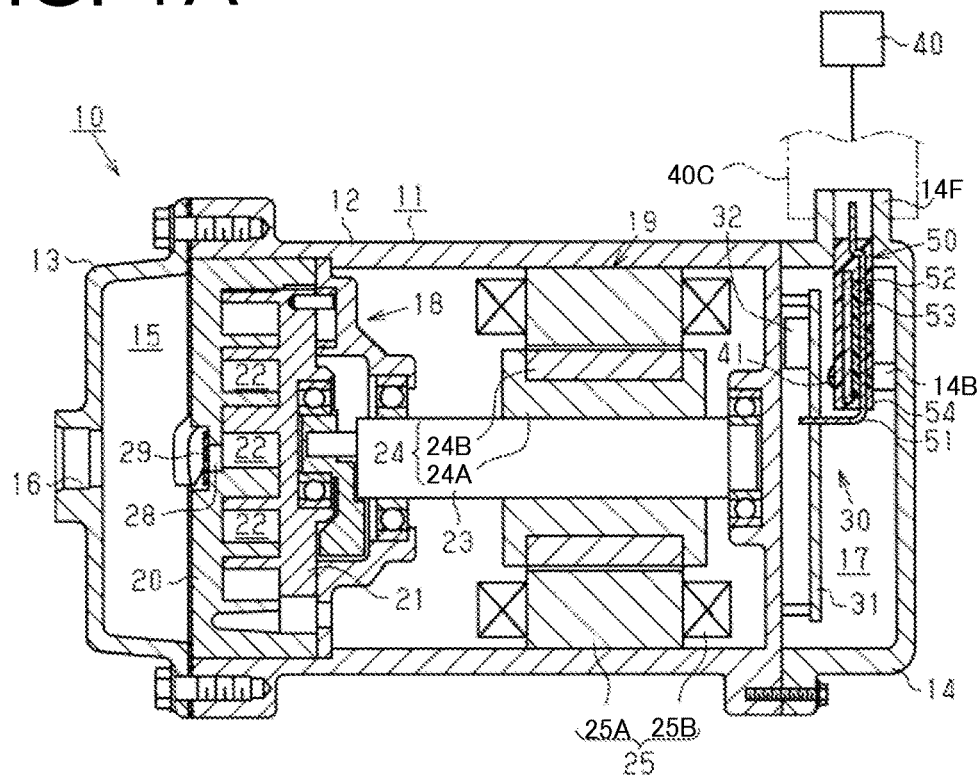
FIG. 1A is a longitudinal cross-sectional view of an electric compressor according to an embodiment of the present invention.

The following will describe an electric compressor according to an embodiment of the present invention with reference to FIGS. 1 to 5. The electric compressor is mounted on a vehicle. As shown in FIG. 1A, the electric compressor which is designated by numeral 10 has a housing 11 made of a metal material (aluminum in the present embodiment). The housing 11 includes a bottomed cylindrical motor housing 12, a discharge housing 13 that is connected to an opened end of the motor housing 12 and a bottomed cylindrical cover 14 that is connected to a bottom wall of the motor housing 12.

A discharge chamber 15 is formed between the motor housing 12 and the discharge housing 13. The discharge housing 13 has therein at the end thereof a discharge port 16, and the discharge chamber 15 is connected to an external refrigeration circuit through the discharge port 16. The motor housing 12 has therein at a position adjacent to the cover 14 a suction port (not shown) and the motor housing 12 is connected to the external refrigeration circuit through the suction port.

A rotary shaft 23 is rotatably supported by a bearing in the motor housing 12. The motor housing 12 accommodates therein a compression mechanism 18 for compressing a refrigerant gas and an electric motor 19 for driving the compression mechanism 18. An accommodation space 17 is formed by the bottom wall of the motor housing 12 and the cover 14, accommodating therein a motor driving circuit 30 for controlling the electric motor 19. The compression mechanism 18, the electric motor 19 and the motor driving circuit 30 are arranged in the housing 11 in this order rearward in axial direction of the rotary shaft 23.

The compression mechanism 18 includes a fixed scroll 20 that is fixed to the motor housing 12 and a movable scroll 21 that is disposed facing the fixed scroll 20. A variable-volume compression chamber 22 is defined by the fixed scroll 20 and the movable scroll 21. The fixed scroll 20 has therein a discharge passage 28 that provides a fluid communication between the compression chamber 22 and the discharge chamber 15, and a discharge valve 29 is provided on the end surface of the fixed scroll 20.

The electric motor 19 includes a rotor 24 that is fixed to the rotary shaft 23 for rotation therewith and a stator 25 that is fixed to the inner peripheral surface of the motor housing 12 around the rotor 24. The rotor 24 includes a rotor core 24A that is fixed on the rotary shaft 23 for rotation therewith and a plurality of permanent magnets provided on the peripheral surface of the rotor core 24A. The stator 25 has a substantially annular shape and formed of a coil 25B wound around teeth (not shown) of the stator core 25A that is fixed to the inner peripheral surface of the motor housing 12.

The motor driving circuit 30 includes a plate-shaped circuit board 31 that is supported by the bottom wall of the motor housing 12 in the accommodation space 17 and various kinds of electronic components 32 (only one 32 being shown in FIG. 1) mounted on the circuit board 31. The circuit board 31 extends in radial direction of the rotary shaft 23 in the accommodation space 17. The motor driving circuit 30 supplies electric power to the electric motor 19.

The cover 14 has a cylindrical connecting portion 14F projecting from the outer periphery of the cover 14. The connecting portion 14F is connected to an external connector 40C of an external power source 40. The accommodation space 17 accommodates therein a wire connection unit 50. The wire connection unit 50 is fixed to a cylindrical boss 14B projecting from the inner surface of the bottom wall of the cover 14 by a bolt 41.

Figure 1B:
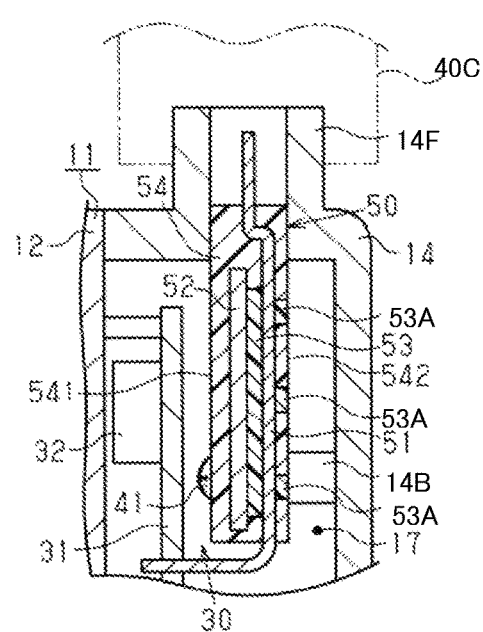
FIG. 1B is a partially enlarged fragmentary view of FIG. 1A, showing a wire connection unit.

As shown in FIG. 1B, the wire connection unit 50 has four bus bars 51 (only one being shown in FIG. 1B) that supplies electric power from the external power source 40 to the circuit board 31. Each bus bar 51 is electrically connected at the one end thereof to the circuit board 31 and at the other end thereof to the external power source 40 via the external connector 40C.

The wire connection unit 50 includes a shield plate 52 that is disposed between the electronic components 32 and the bus bar 51 to prevent the transmission of electromagnetic noise from the electronic components 32 to the bus bar 51. The wire connection unit 50 further includes an intervening portion 53 that is made of a resin and interposed between the bus bar 51 and the shield plate 52. The intervening portion 53 has a plate shape. Electric insulation between the bus bar 51 and the shield plate 52 is ensured by the intervening portion 53. The wire connection unit 50 further includes a resin member 54 that is made of a resin in which the bus bar 51, the intervening portion 53 and the shield plate 52 are integrated. The resin member 54 and the intervening portion 53 are made of the same resin.

Figure 2A:
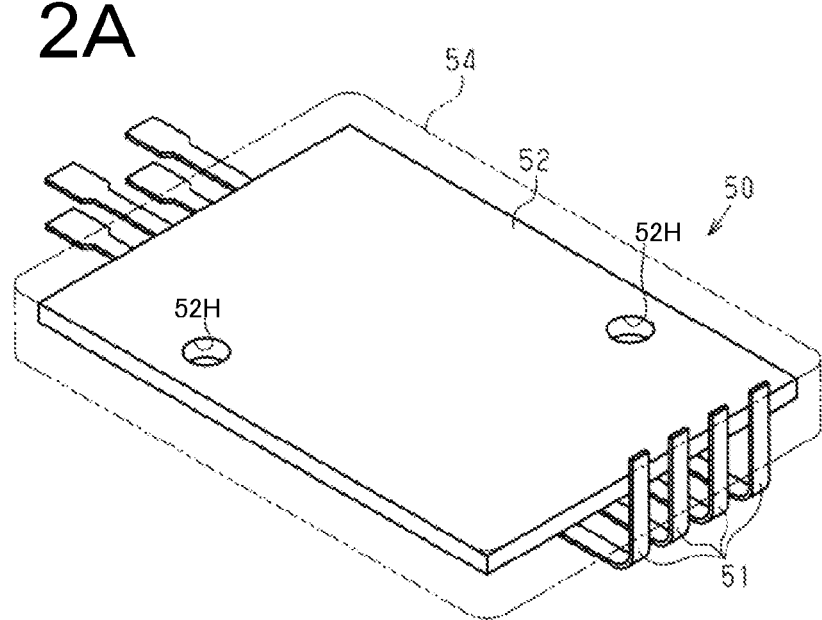
FIGS. 2A and 2B are perspective views of the wire connection unit of FIG. 1B, respectively.
Figure 2B:
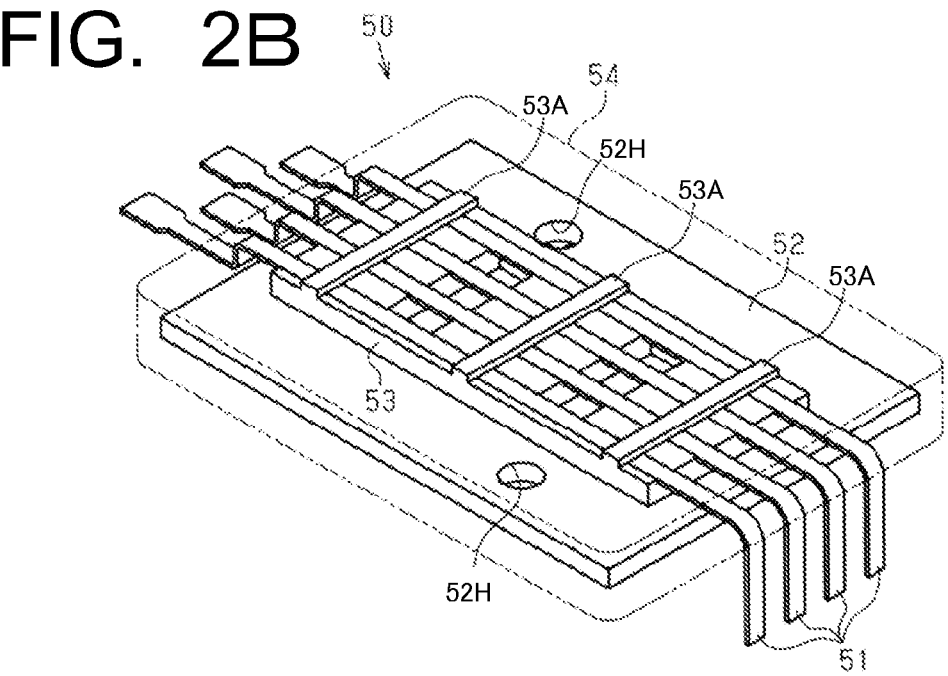

Referring to FIGS. 2A and 2B, the bus bars 51 having a narrow strip shape are made of a metal and extend parallel to each other. The intervening portion 53 has three connecting portions 53A disposed on the side of the intervening portion 53 that is opposite from the shield plate 52 and connecting the bus bars 51. The connecting portions 53A extend parallel to each other and perpendicularly to the bus bars 51. The intervening portion 53 is in contact with the shield plate 52.

The shield plate 52 is made of a metal and has a rectangular plate shape. The shield plate 52 has therethrough two circular bolt holes 52H through which a bolt 41 is to be inserted. One bolt hole 52H is located at a position that is adjacent to one long side and one short side of the shield plate 52. The other bolt hole 52H is located at a position that is adjacent to the other long side and the other short side of the shield plate 52.

Figure 3A:
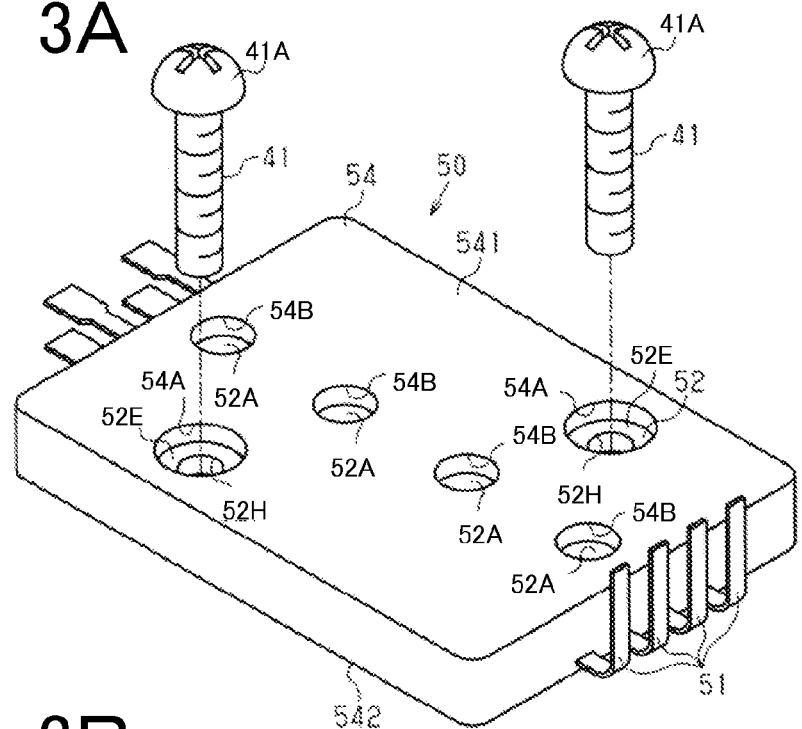
FIG. 3A is a perspective view of the wire connection unit of FIG. 1B.
Figure 3B:
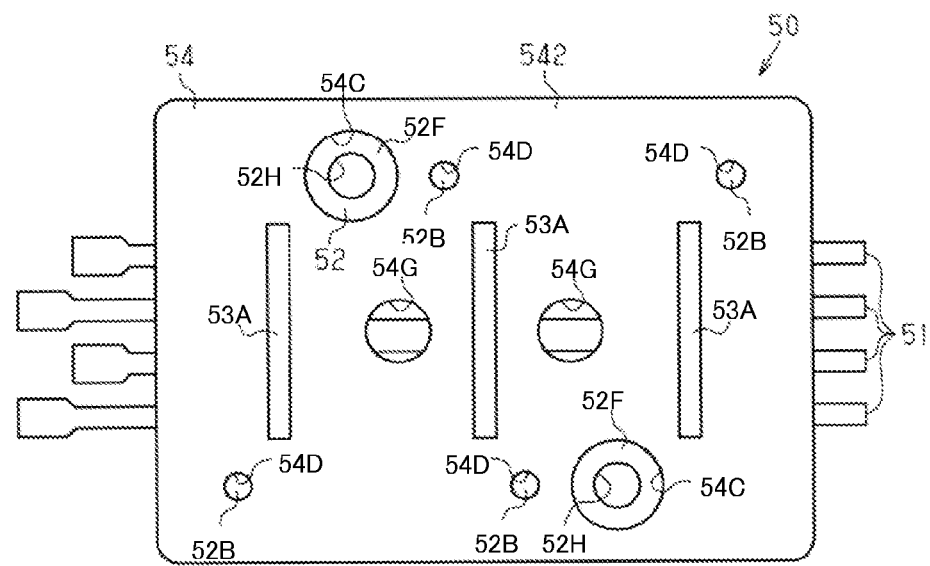
FIG. 3B is a plan view of the wire connection unit of FIG. 3A.

As shown in FIGS. 3A and 3B, the resin member 54 shapes the outline of the wire connection unit 50 and is formed in a rectangular plate shape. Referring to the FIG. 3A, the resin member 54 has on the side thereof that faces the circuit board 31 a first surface 541, and a hole 54A each having a circular shape in plan view is formed through the resin member 54, extending from the first surface to the shield plate 52, at positions corresponding to the respective bolt hole 52H. As shown in FIG. 3A, the hole 54A is formed with a diameter that is greater than that of the bolt hole 52H, so that a part of the surface of the shield plate 52 around the bolt hole 52H is free from the resin of the resin member 54 and hence exposed. Thus, each hole 54A has therein a seat 52E that is formed by the exposed surface of the shield plate 52 around the bolt hole 52H and receives a bolt head 41A of the bolt 41.

The resin member 54 further has four circular holes 54B formed extending from the first surface 541 to the shield plate 52 and aligned at a interval at the center in the longitudinal direction of the resin member 54, so that a part of the surface of the shield plate 52 on the side thereof that is opposite from the intervening portion 53 is free from the resin of the resin member 54 and hence exposed through the hole 54B. Such part of the shield plate surface will be referred to an exposed portion 52A. In other words, a surface of the shield plate 52 on the side thereof that is opposite from the intervening portion 53 has the exposed portion 52A that is exposed without being covered with the resin member 54.

As shown in FIG. 3B, the resin member 54 has a second surface 542 on side thereof that is opposite from the circuit board 31. Two holes 54C each having a circular shape in plan view is formed, extending from the second surface 542 of the resin member 54 to the shield plate 52, at positions corresponding to the respective bolt holes 52H. The hole 54C is formed with a diameter that is greater than that of the bolt hole 52H, so that a part of the surface of the shield plate 52 around the bolt hole 52H, or a contact surface 52F, is free from the resin of the resin member 54 and hence exposed through the hole 54C. The boss 14B of the cover 14 is inserted in the hole 54C with the end of the boss 14B set in contact with the contact surface 52F.

In addition, four circular holes 54D are formed in the resin member 54, or two holes 54D being located at positions adjacent to each long side of the resin member 54, each extending from the second surface 542 of the resin member 54 to the shield plate 52, so that a part of the surface of the shield plate 52, or an exposed portion 52B, is free from the resin of the resin member 54 and hence exposed through the holes 54D.

Furthermore, the resin member 54 further has in the second surface 542 thereof two holes 54G that are located at the center and spaced at an interval in longitudinal direction of the resin member 54. The holes 54G extends from the second surface 542 to the bus bar 51, so that a part of the bus bar 51 is exposed through the holes 54G without being covered with the resin of the resin member 54. In addition, the surface of the connecting portion 53A of the intervening portion 53 on the side thereof that is opposite from the shield plate 52 are exposed and leveled with the second surface 542 of the resin member 54. In other words, a part of the surfaces of the intervening portion 53 and the bus bar 51 on the sides thereof that are opposite from the shield plate 52 are exposed without being covered with the resin of the resin member 54.

Figure 4A:
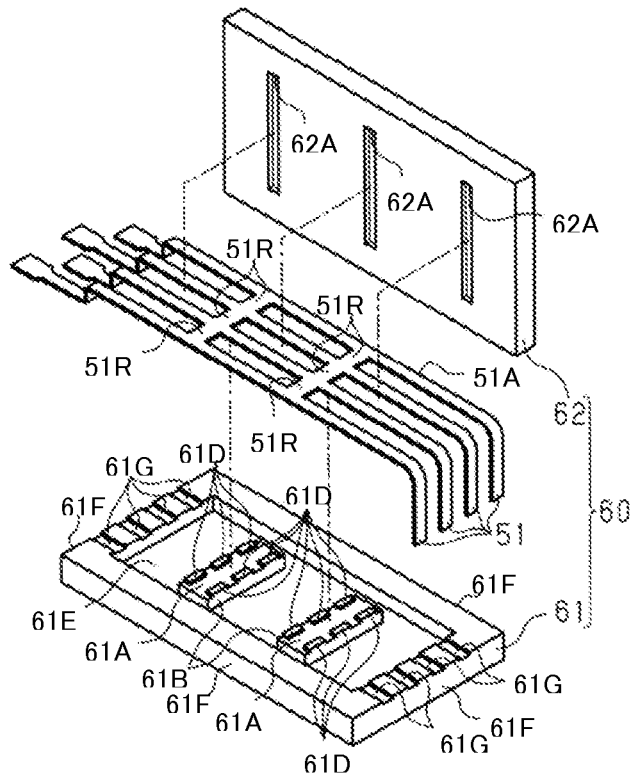
FIG. 4A is an exploded perspective view showing a state before a bus bar forming plate is set in a first mold.
Figure 4B:
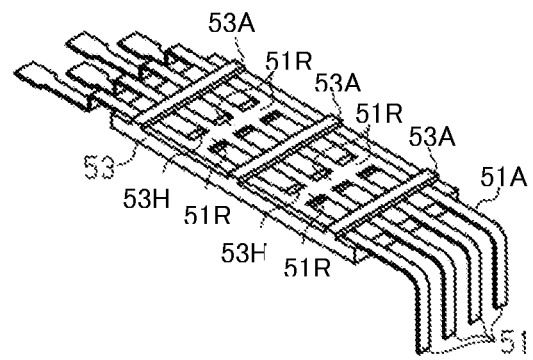
FIG. 4B is a perspective view of the bus bar forming plate, showing a state in which an intervening portion and connecting portions are integrally molded.

As shown in FIG. 4A, 51A designates a bus bar forming plate having four bus bars 51 and link portions 51R that connect any two adjacent bus bars 51. Except the opposite ends, the bus bar forming plate 51A is set in a first mold 60. The first mold 60 includes a pair of mold members 61, 62. The mold member 61 is generally of a rectangular shape, having a bottom portion 61E and four side portions, i.e. two long side portions 61F and two short side portions 61F.

The bottom portion 61E has two mounting portions 61B each having a mounting surface 61A to which the bus bar forming plate 51A is to be mounted. Specifically, the link portions 51R of the bus bar forming plate 51A are placed on the mounting surface 61A. Each mounting surface 61A of the mounting portion 61B has a plurality of pairs of projections 61D that are arranged so that each link portion 51R of the bus bar forming plate 51A is held at opposite sides thereof by the projections 61D of a pair. The mold member 61 has in the surface of each short side portion 61F on the side facing the bus bar forming plate 51A four fitting groove 61G that receive therein the bus bars 51.

The mold member 62 is provided so as to close the recessed portion of the mold member 61. The mold member 62 has in the surface on the side thereof facing the mold member 61 three grooves 62A for forming the connecting portions 53A of the intervening portion 53.

The bus bar forming plate 51A is mounted on the mounting surface 61A of the mold member 61 in such a manner that each link portion 51R is positioned between the paired of the projections 61D and the opposite ends of the bus bars 51 are fitted in the fitting grooves 61G. The recessed portion of the mold member 61 is closed by the mold member 62. The surface of the mold member 62 facing the mold member 61 is in contact with the bus bar forming plate 51A. The bus bar forming plate 51A is held by the mounting portion 61B of the mold member 61. Thus, the bus bar forming plate 51A is held securely by and between the pair of mold members 61, 62.

With the bus bar forming plate 51A held by the mold members 61, 62, a resin is injected into the cavity of first mold 60. As the resin is solidified, the intervening portion 53 and the connecting portions 53A are molded together to the bus bar forming plate 51A. Because the bus bar forming plate 51A is formed of a single plate in which bus bars 51 are joined by the link portions 51R, bending of the bus bar 51 may be caused by the injection pressure of resin into the cavity of the first mold 60 is prevented. Furthermore, holes 53H are formed in the intervening portion 53 at the positions corresponding to the link portion 51R.

Figure 4C:
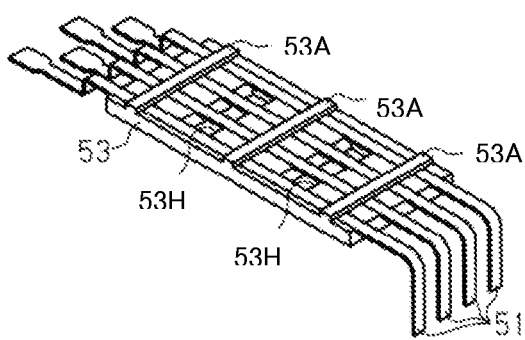
FIG. 4C is a perspective view similar to FIG. 4B, but showing a state in which a link portion is removed and bus bars are connected by the connecting portions.

As shown in FIG. 4C, the link portions 51R are then removed by punching. Because the holes 53H are formed in the intervening portion 53, the link portion 51R may be removed easily. Thus, the bus bars 51 are electrically independent of each other. The bus bars 51 are integrated with the intervening portion 53 by the connecting portions 53A and form an integrated part.

Figure 5:
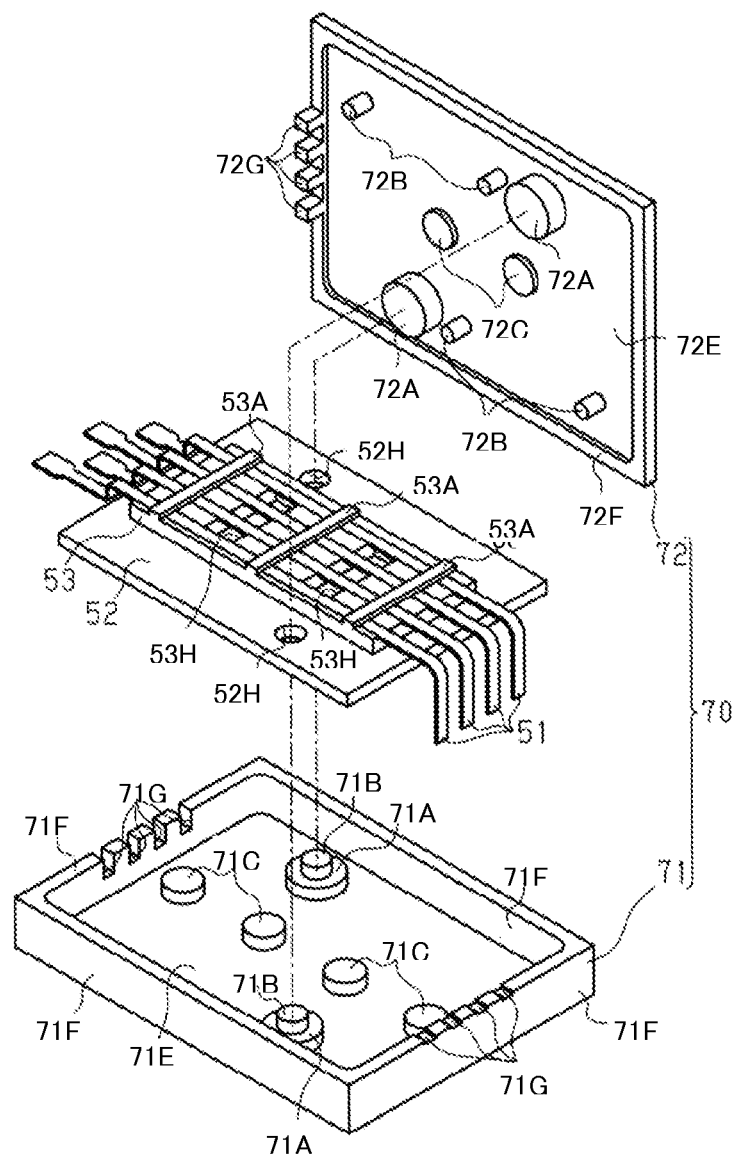
FIG. 5 is an exploded perspective view showing a state before the bus bar, an intervening portion and a shield plate are set in a second mold.

As shown in FIG. 5, the integrated part, in which the bus bar 51 and the intervening portion 53 are connected by the connecting portions 53A, and the shield plate 52 are placed in a second mold 70. The second mold 70 includes a pair of mold members 71, 72. The mold member 71 has generally a rectangular shape and includes a bottom portion 71E and four side portions 71F that extend vertically from the four sides of the bottom portion 71E of a rectangular shape.

The mold member 71 has two cylindrical first projections 71A extending from the bottom portion 71E of the mold member 71 and having annular contact surfaces and top projections 71B. The first projections 71A are located at positions corresponds to the bolt hole 52H formed through the shield plate 52 so that the annular contact surface of the first projection 71A are placed in contact with the surface of the shield plate 52 on the side thereof that is opposite from the intervening portion 53 around the bolt hole 52H and also that the top projections 71B are inserted through the bolt hole 52H.

The mold member 71 further has four cylindrical second projections 71C extending from the bottom portion 71E and each having a contact surface that is placed in contact with the surface of the shield plate 52 on the side thereof opposite from the intervening portion 53. The second projections 71C are aligned at an interval at the center of the bottom portion 71E in the longitudinal direction thereof. The mold member 71 has fitting grooves 71G formed in the opposite short side portions 71F to receive therein the ends of the respective bus bars 51.

The mold member 72 has a rectangular plate shape and includes a bottom portion 72E and four side portions 72F projecting from the four sides of the bottom portion 72E of a rectangular shape. The mold member 72 has fitting projections 72G in one of the short side portions 72F inserted in the fitting grooves 71G formed in one short side portion 71F of the mold member 71.

The mold member 72 further has two cylindrical third projections 72A extending from the surface of the bottom portion 72E on the side thereof facing the mold member 71 and each having a contact surface which is brought into contact with a part of the surface of the shield plate 52 on the side thereof that faces the intervening portion 53 around the bolt hole 52H. The contact surface of the third projection 72A is placed into contact with the top projection 71B of its corresponding first projection 71A of the mold members 71.

The mold member 72 has four cylindrical fourth projections 72B extending from the surface of the bottom portion 72E on the side thereof that faces the mold member 71 and each having a contact surface which is brought into contact with the surface of the shield plate 52 on the side thereof that faces the intervening portion 53. Two of the fourth projections 72B are arranged at positions that are adjacent to one long side portion 72F, while the other two fourth projections 72B are arranged at positions adjacent to the other long side portion 72F.

Furthermore, the mold member 72 has therein two cylindrical fifth projections 72C extending from the surface of the bottom portion 72E on the side thereof that faces the mold member 71 and each having a contact surface. The fifth projections 72C are disposed at the center of the bottom portion 72E of the mold member 72, spaced at an interval in the longitudinal direction of the mold member 72. The contact surfaces of the fifth projections 72C are brought into contact with the bus bar 51.

The shield plate 52 is placed on the mold member 71 in such a manner that the top projections 71B are inserted into the bolt hole 52H and the annular contact surface of the first projections 71A are set in contact with the surface of the shield plate 52 on the side thereof that is opposite from the intervening portion 53.

The integrated part in which the bus bars 51 and the intervening portion 53 are integrated by the connecting portion 53A is placed in the mold member 71 in such a manner that the surface of the intervening portion 53 is in contact with the shield plate 52. In this case, the bolt holes 52H are positioned across the intervening portion 53 without overlapped with the intervening portion 53. The opposite ends of each bus bar 51 are fitted in the fitting groove 71G.

Subsequently, the mold member 72 is placed over the mold member 71 in such a manner that the contact surfaces of the third projections 72A and the contact surfaces of the fourth projections 72B are set in contact with the surface of the shield plate 52 on the side thereof that faces the intervening portion 53 and the surfaces of the fifth projection 72C are set in contact with a part of the bus bar 51, respectively. The contact surfaces of the third projection 72A are in contact with the contact surface of the top projection 71B. The fitting projections 72G of the mold member 72 are inserted into the fitting grooves 71G of the mold member 71.

The shield plate 52 is held in the mold members 71, 72 in the second mold 70 by the contact surfaces of the first projections 71A and the second projections 71C of the mold member 71 and by the contact surfaces of the third projections 72A and the fourth projections 72B of the mold member 72. Furthermore, the bus bar 51, the intervening portion 53 and the shield plate 52 are held in the mold members 71, 72 in the second mold 70 by the contact surfaces of the first projection 71A and the second projection 71C of the mold member 71 and the contact surface of the fifth projection 72C of the mold member 72.

With the bus bar 51, the intervening portion 53 and the shield plate 52 thus held in the mold members 71, 72 in the mold 70, resin is injected into the second mold 70 and allowed to be solidified. Thus, the resin member 54 is formed, thus the wire connection unit 50 is being made.

The following will describe the effects of the compressor 10. The above described wire connection unit 50 is advantageous in preventing the transmission of electromagnetic noise from the electronic components 32 to the bus bar 51, as compared with the case in which the shield plate of the wire connection unit has a hole through which a part of one of the mold members is inserted for holding a bus bar.

The above described the compressor 10 according to the embodiment offers the following effects.

(1) The contact surfaces of the first projections 71A of the mold member 71 are placed in contact with the surface of the shield plate 52 on the side thereof opposite from the intervening portion 53 around the bolt hole 52H and the contact surfaces of the fifth projections 72C of the mold member 72 are placed in contact with a part of the bus bar 51. This enables the bus bars 51, the intervening portion 53 and the shield plate 52 to be held by the pair of mold members 71, 72. This is advantageous in that the transmission of the electromagnetic noise from the electronic components 32 to the bus bar 51 is prevented and also that a hole needs not be formed through the shield plate 52 for insertion of a part of one of mold members for holding the bus bar. Additionally, a part of the surface of the shield plate 52 around the bolt hole 52H, with which the contact surface of the first projection 71A of the mold member 71 is placed in contact, is exposed without being covered with the resin member 54 and serves as the seat 52E of the bolt 41. Consequently, a washer need not be provided as a seat for the bolt 41. This is advantageous in preventing the transmission of electromagnetic noise from the electronic components 32 to the bus bar 51 and reducing the number of parts.

(2) The aforementioned exposed portion 52A that is not covered with the resin member 54 is formed on the surface of the shield plate 52 on the side thereof that is opposite from the intervening portion 53. Resin molding of the bus bar 51, the intervening portion 53 and the shield plate 52 may cause thermal deformation of the shield plate 52. The exposed portion 52A is formed because the contact surfaces of the second projection 71C of the mold member 71 are set in contact with the shield plate 52 while the resin member 54 is formed. In other words, the number of positions in the shield plate 52 that are in contact with the mold member 71 is increased while the bus bar 51, the intervening portion 53 and the shield plate 52 are being resin-molded, thus preventing the thermal deformation of the shield plate 52.

(3) The resin member 54 and the intervening portion 53 are made of the same kind of resin. This is advantageous in simplifying the structure as compared with the case in which the resin member 54 and the intervening portion 53 are made of different kind of resin.

(4) Since no hole needs to be formed in the shield plate 52 to remove the link portion 51R, the number of holes in the shield plate 52 is minimized and, accordingly, the shield performance of the shield plate 52 can be increased.

(5) The surface of the shield plate 52 around the bolt hole 52H serves as the seat 52E for the bolt head 41A of the bolt 41. Consequently, the wire connection unit 50 is firmly fixed to the cover 14 because no loosening of the bolt 41 due to the thermal deformation of the resin member 54 occurs, as compared with a case in which the bolt head 41A is seated on the resin member 54.

(6) The holes 54A, 54B, 54C, 54D, 54G serve to absorb and hence prevent any thermal deformation of the resin member 54.

The above-described embodiment of the present invention may be modified in various manners as exemplified below.

It may be so configured that the contact surface of the fifth projection 72C of the mold member 72 is placed in contact with the surface of the intervening portion 53 on the side thereof that is opposite from the shield plate 52.

It may be so configured that the contact surface of the fifth projection 72C of the mold member 72 is placed in contact with a part of the surface of the bus bar 51 and the surface of the intervening portion 53 on the side thereof that is opposite from the shield plate 52.

The resin member 54 and the intervening portion 53 may be made of the different kinds of resin.

The number of the exposed portions 52A is not specifically limited.

The number of the exposed portion 52B is not specifically limited, either.

The exposed portion 52A need not be formed.

The exposed portion 52B need not be formed.

The holes 54A, 54B, 54C, 54D, 54G are not limited to a circular hole in plan view, but such holes may have any shape such as square in plan view.

The number of the bus bars 51 is not specifically limited.

The wire connection unit 50 may be fixed to the bottom wall of the motor housing 12 by the bolt 41.

Although the compression mechanism 18, the electric motor 19 and the motor driving circuit 30 are arranged in this order in the axial direction of the rotary shaft 23 in the housing 11 in the above-described embodiment, it may be so configured that the electric motor 19, the compression mechanism 18 and the motor driving circuit 30 are disposed in the housing 11 in this order in the axial direction of the rotary shaft 23.

The cover 14 may be fixed to the periphery of the housing 11, and the motor driving circuit 30 may be disposed in a space defined by the periphery of the housing 11 and the cover 14.

Although the above description has been made in relation to the compression mechanism 18 having the fixed scroll 20 and the movable scroll 21, the present invention is applicable to a piston type or a vane type compressor.

What is claimed is:

1. An electric compressor comprising:
    a housing;
    a compression mechanism disposed in the housing;
    an electric motor disposed in the housing;
    a motor driving circuit disposed in the housing and including a circuit board and an electronic component mounted on the circuit board;
    a bus bar configured to supply electric power from an external power source to the circuit board; and
    a shield plate provided between the electronic component and the bus bar for preventing transmission of electromagnetic noise;
    wherein the shield plate has a bolt hole through which a bolt is inserted,
    wherein an intervening portion is made of a resin and interposed between the bus bar and the shield plate to ensure electric insulation therebetween,
    wherein the bus bar, the intervening portion, and the shield plate are substantially enclosed over top and bottom portions thereof by a resin member,
    wherein a part of the intervening portion on a side thereof opposite from the shield plate and/or a part of the bus bar on a side thereof opposite from the shield plate is exposed through the resin member without being covered with the resin member, and
    wherein a part of the shield plate around the bolt hole on a side thereof opposite from the intervening portion is exposed through the resin member without being covered with the resin member.

2. The electric compressor according to claim 1, wherein a surface of the shield plate on the side thereof opposite from the intervening portion has an exposed portion that is exposed without being covered with the resin member.

3. The electric compressor according to claim 1, wherein the intervening portion and the resin member are made of the same kind of resin.

4. The electric compressor according to claim 1, wherein the intervening portion comprises a rectangular frame.

5. The electric compressor according to claim 4, wherein the intervening portion further comprises cross-bars extending across the rectangular frame.

* * * * *